US012207045B2

(12) United States Patent
Ikeda

(10) Patent No.: US 12,207,045 B2
(45) Date of Patent: Jan. 21, 2025

(54) PANEL SPEAKER

(71) Applicant: DENSO TEN Limited, Hyogo (JP)

(72) Inventor: Shinichi Ikeda, Kobe (JP)

(73) Assignee: DENSO TEN Limited, Kobe (JP)

( * ) Notice: Subject to any disclaimer, the term of this patent is extended or adjusted under 35 U.S.C. 154(b) by 211 days.

(21) Appl. No.: 18/156,630

(22) Filed: Jan. 19, 2023

(65) Prior Publication Data

US 2023/0239607 A1 Jul. 27, 2023

(30) Foreign Application Priority Data

Jan. 26, 2022 (JP) ................................ 2022-009877

(51) Int. Cl.

| | |
|---|---|
| ***H04R 1/02*** | (2006.01) |
| ***H04R 1/28*** | (2006.01) |
| ***H04R 7/04*** | (2006.01) |
| ***H04R 9/06*** | (2006.01) |
| ***H04R 17/00*** | (2006.01) |

(52) U.S. Cl.

CPC ........... *H04R 1/2803* (2013.01); *H04R 1/028* (2013.01); *H04R 7/04* (2013.01); *H04R 17/00* (2013.01); *H04R 2499/15* (2013.01)

(58) Field of Classification Search

CPC ........ H04R 1/2803; H04R 1/028; H04R 7/04; H04R 17/00

See application file for complete search history.

(56) References Cited

U.S. PATENT DOCUMENTS

| | | | | |
|---|---|---|---|---|
| 10,448,131 | B1 * | 10/2019 | Tanaka | H04R 1/028 |
| 2016/0068332 | A1 * | 3/2016 | Flynn | B65D 75/28 206/451 |
| 2018/0348872 | A1 * | 12/2018 | Shiroto | G06F 3/016 |
| 2019/0212865 | A1 * | 7/2019 | Shiroto | G06F 3/016 |

FOREIGN PATENT DOCUMENTS

| | | |
|---|---|---|
| JP | 2007-312269 A | 11/2007 |
| JP | 2019-186829 A | 10/2019 |

* cited by examiner

*Primary Examiner* — Simon King
(74) *Attorney, Agent, or Firm* — Oliff PLC

(57) ABSTRACT

A panel speaker includes: a first panel; a second panel; a vibration actuator configured to vibrate the first panel and the second panel; an adhesive layer configured to adhere one surface of the first panel to one surface of the second panel; and a coupling portion configured to couple other surface of the second panel with the vibration actuator, the adhesive layer includes a plurality of strip-shaped regions parallel to one direction in a plan view of the second panel, and the coupling portion is disposed at a region sandwiched between adjacent two of the plurality of strip-shaped regions in the plan view of the second panel.

16 Claims, 11 Drawing Sheets

PANEL SPEAKER

CROSS-REFERENCE TO RELATED APPLICATION

This application is based on and claims priority under 35 USC 119 from Japanese Patent Application No. 2022-009877 filed on Jan. 26, 2022.

TECHNICAL FIELD

The present invention relates to a panel speaker.

BACKGROUND ART

There is a display speaker in which a display panel of a display is vibrated by an actuator (vibration actuator) using a piezoelectric element, and thus the display is used as a speaker. In the display speaker, the vibration actuator is attached to a transmission panel fixed to a back surface of the display panel (vibration panel). Thus, a vibration of the vibration actuator can be transmitted to the display panel via the transmission panel. The display speaker is an example of a panel speaker.

As conventional arts, P2007-312269A and JP2019-186829A are known.

SUMMARY OF INVENTION

The transmission panel is fixed to the display panel with a double-sided adhesive tape. In the display panel, a sound pressure at each frequency of a sound output from the display speaker changes depending on a region to which the double-sided adhesive tape is attached. Depending on the region to which the double-sided adhesive tape is attached, the sound quality of the sound output from the display speaker is lowered.

An object of the present disclosure is to provide a panel speaker with improved sound quality of an output sound.

To achieve the object, the following means are adopted.

That is, a first aspect is a panel speaker including:

a first panel;

a second panel;

a vibration actuator configured to vibrate the first panel and the second panel;

an adhesive layer configured to adhere one surface of the first panel to one surface of the second panel; and a coupling portion configured to couple the other surface of the second panel with the vibration actuator, in which the adhesive layer includes a plurality of strip-shaped regions parallel to one direction in a plan view of the second panel, and the coupling portion is disposed at a region sandwiched between adjacent two of the plurality of strip-shaped regions in the plan view of the second panel.

According to the disclosed technique, a panel speaker with improved sound quality of an output sound can be provided.

DETAILED DESCRIPTION OF THE INVENTION

Hereinafter, an embodiment will be described with reference to the accompanying drawings. A configuration of the embodiment is an example, and a configuration of the invention is not limited to a specific configuration of the disclosed embodiment. In carrying out the invention, a specific configuration according to the embodiment may be adopted as appropriate.

Here, a case will be described in which a vibration actuator is attached to a transmission panel, further, the transmission panel is provided on a display panel (vibration panel) of a display, and the display functions as a display speaker. A panel speaker is a device that outputs (emits) sound waves (sound) from a display panel by using a vibration actuator (actuator) to vibrate the display panel via a transmission panel. The display speaker is an example of a panel speaker. The panel speaker is, for example, a speaker that outputs a sound by vibrating a planar panel such as the display panel.

Comparative Example

Figure 1:
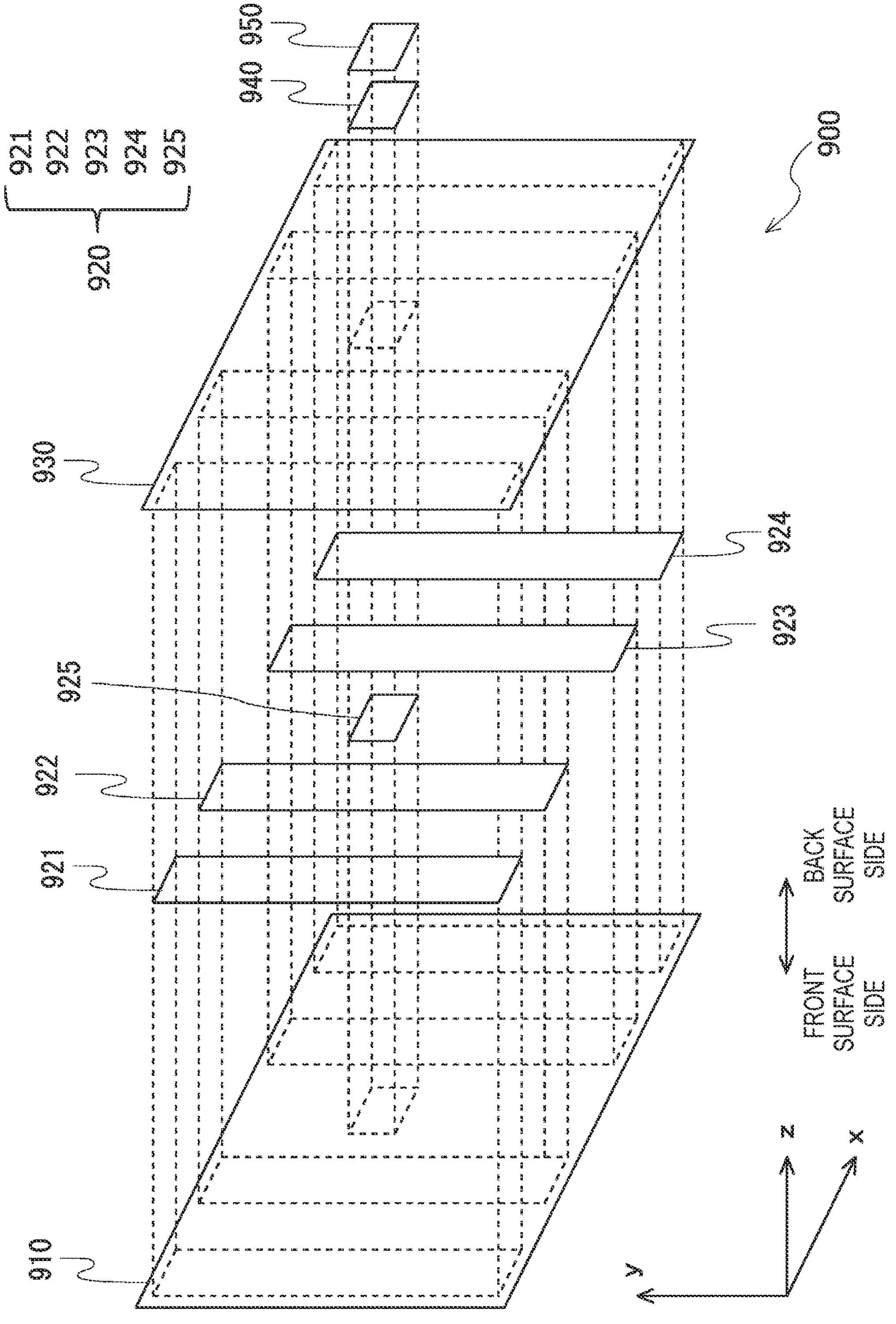
FIG. 1 is an exploded perspective view of a display speaker 900.
Figure 2:
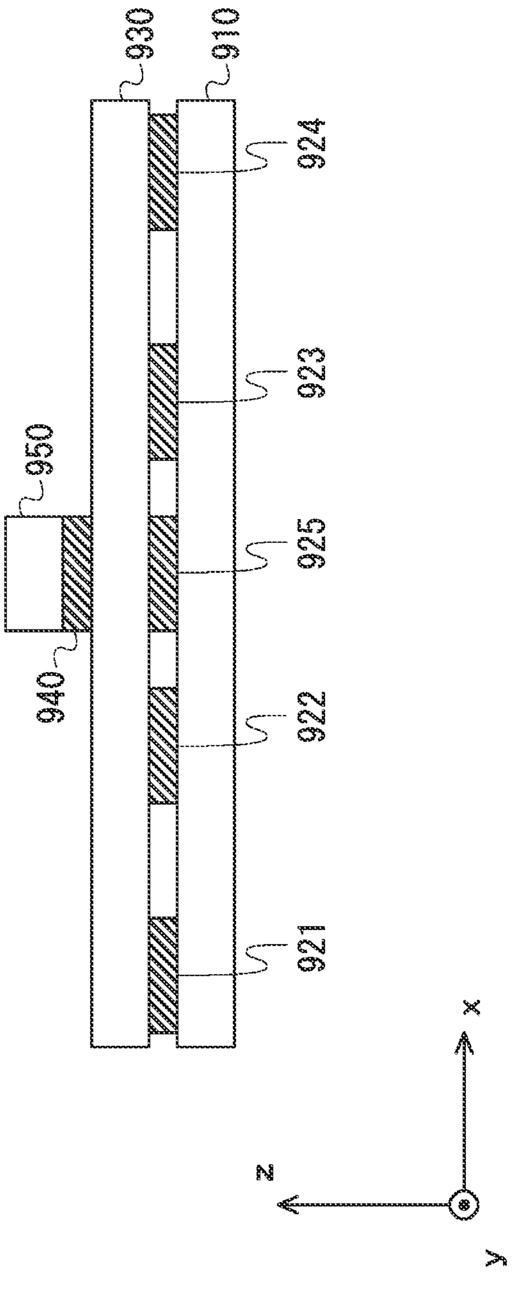
FIG. 2 is a cross-sectional view taken along a plane that passes through a vibration actuator 950 of the display speaker 900 and that is parallel to an xz plane.
Figure 3:
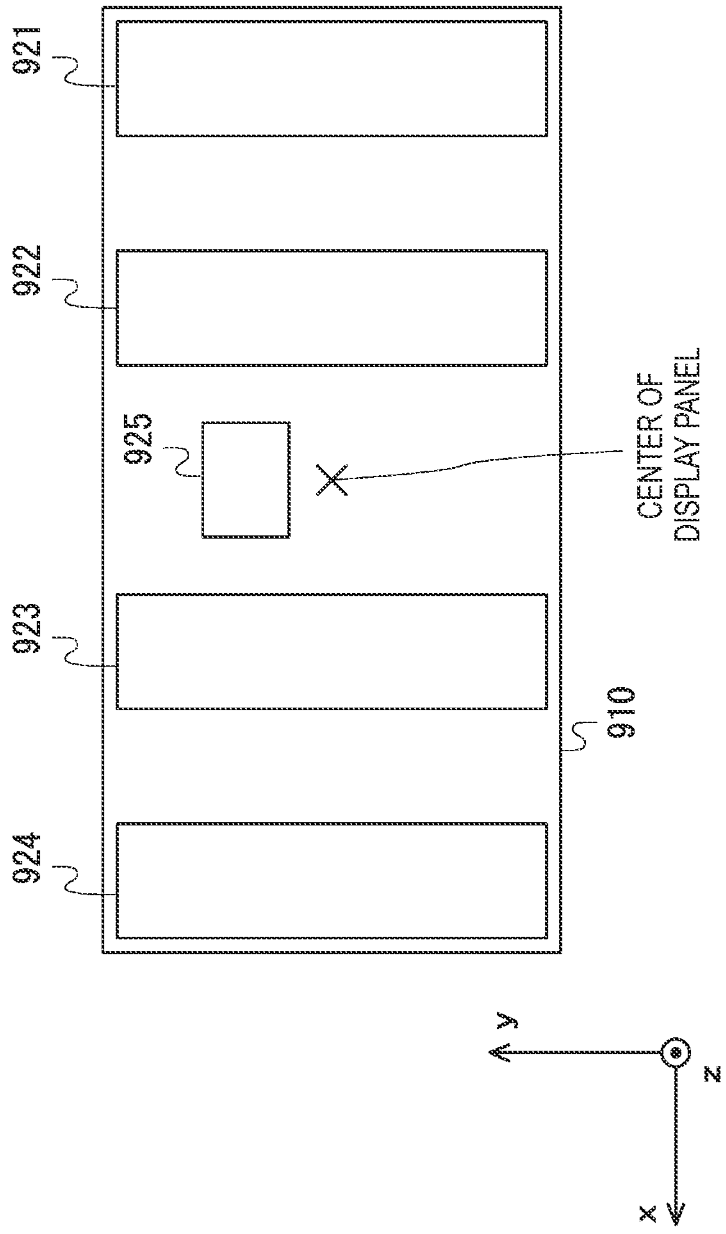
FIG. 3 is a view of a display panel 910 and a first adhesive layer 920 as viewed from a back surface side.

FIGS. 1 to 3 are views showing a configuration example of a display speaker 900 of a comparative example of the present embodiment. FIG. 1 is an exploded perspective view of the display speaker 900. The display speaker 900 includes a display panel 910, a first adhesive layer 920, a transmission panel 930, a second adhesive layer 940, and a vibration actuator 950. Here, in a plan view of the display panel 910 as viewed from a front surface side, a direction from left to right is defined as an x direction, a direction from bottom to top is defined as a y direction, and a direction from a front surface to a back surface is defined as a z direction. The x direction, the y direction, and the z direction are orthogonal to one another. FIG. 2 is a cross-sectional view taken along a plane that passes through the vibration actuator 950 of the display speaker 900 and that is parallel to an xz plane. FIG. 3 is a view of the display panel 910 and the first adhesive layer 920 as viewed from a back surface side.

The display panel 910 is a plate-shaped rectangular panel serving as a diaphragm of the display speaker 900. Each side of an outer shape of the display panel 910 is parallel to an x axis or a y axis.

The first adhesive layer 920 is divided into a plurality of regions, and adheres a back surface side of the display panel 910 to a front surface side of the transmission panel 930. In the example of FIG. 1, the first adhesive layer 920 includes a first region 921, a second region 922, a third region 923, a fourth region 924, and a fifth region 925. Each region of the first adhesive layer 920 is, for example, a double-sided adhesive tape. The regions are arranged at different positions so as not to overlap one another in a plan view. Each of the first region 921, the second region 922, the third region 923, and the fourth region 924 is a strip-shaped rectangle parallel to the y axis. The first region 921 and the fourth region 924 have the same distance from a center of the display panel 910 (the transmission panel 930) in the x direction. Further, the first region 921 and the fourth region 924 are located at point-symmetric positions with respect to the center of the display panel 910. The second region 922 and the third region 923 have the same distance from the center of the display panel 910 in the x direction. The second region 922 and the third region 923 are located at point-symmetric positions with respect to the center of the display panel 910. The fifth region 925 is disposed at a position shifted in parallel in the y direction from the center of the display panel 910 (the transmission panel 930) in a plan view. The display panel 910 and the transmission panel 930 are not adhered to each other at a portion other than the regions of the first adhesive layer 920 between the display panel 910 and the transmission panel 930.

The transmission panel 930 is disposed on the back surface side of the display panel 910 and between the display panel 910 and the vibration actuator 950. The transmission panel 930 is a rectangular panel having substantially the same size as the display panel 910 when viewed from front. The transmission panel 930 transmits a vibration of the vibration actuator 950 to the display panel 910.

For example, the second adhesive layer 940 is disposed over the entire front surface of the vibration actuator 950, and bonds a back surface side of the transmission panel 930 and a front surface side of the vibration actuator 950. The second adhesive layer 940 is, for example, a double-sided adhesive tape. The second adhesive layer 940 is disposed at a position shifted in parallel in the y direction from the center of the transmission panel 930 in a plan view. In a plan view (when viewed from the front surface side or the back surface side, when viewed from a direction orthogonal to the x direction and the y direction), the second adhesive layer 940 overlaps the fifth region 925 of the first adhesive layer 920.

The vibration actuator 950 is disposed on the back surface side of the transmission panel 930. The vibration actuator 950 is a plate-shaped rectangular member smaller than the transmission panel 930. The vibration actuator 950 is, for example, a piezoelectric element. The vibration actuator 950 vibrates by expanding and contracting according to an applied drive voltage.

Figure 4:
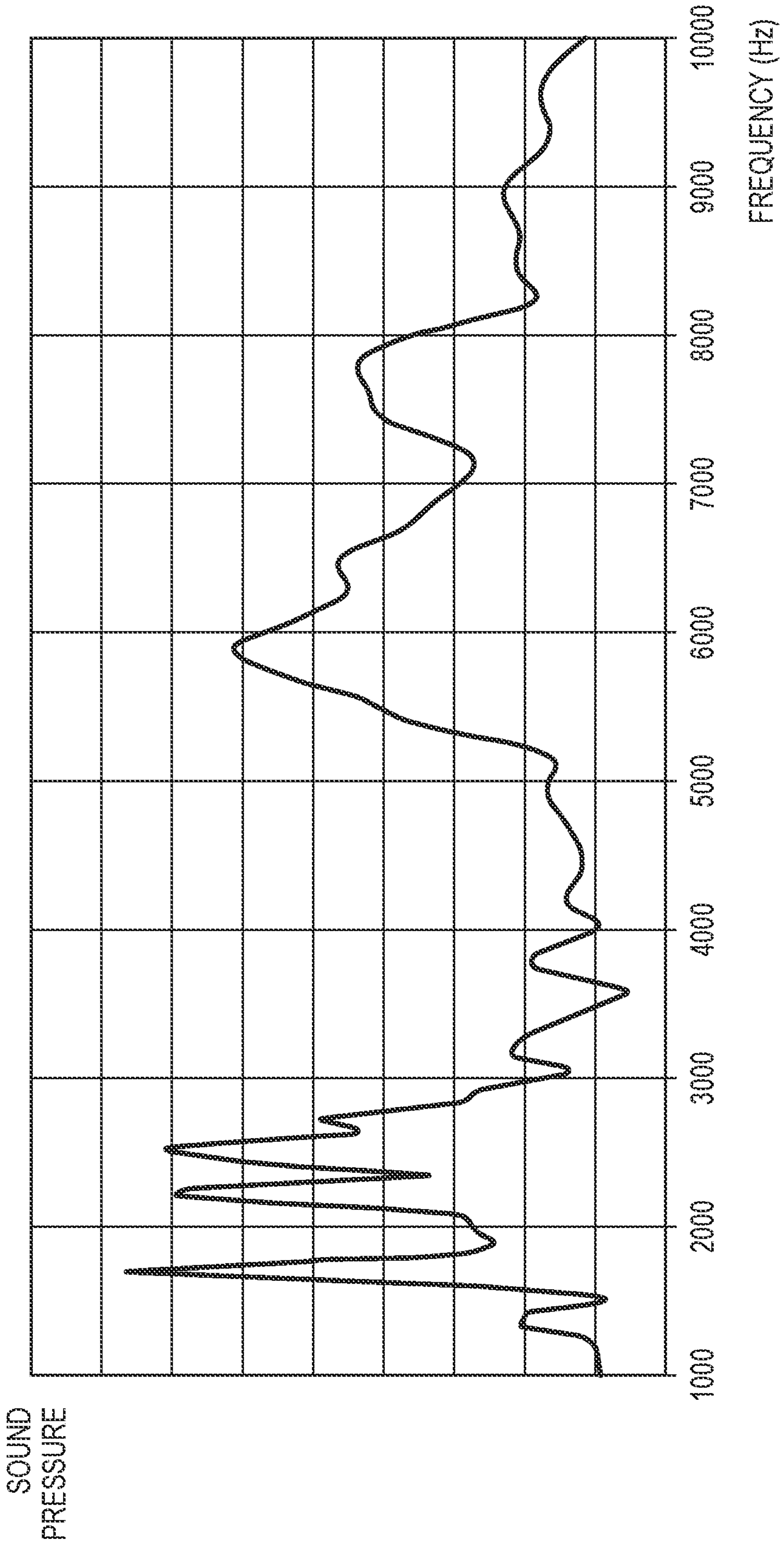
FIG. 4 is a diagram showing an example of frequency dependence of a sound pressure of a sound output from the display speaker 900.

FIG. 4 is a diagram showing frequency dependence of a sound pressure of a sound output from the display speaker 900. In the graph of FIG. 4, a horizontal axis represents a frequency, and a vertical axis represents a sound pressure. The sound pressure on the vertical axis is not an absolute sound pressure value but a relative value with respect to a reference value. In a plan view, the transmission panel 930 and the display panel 910 are adhered to each other at a position where the vibration actuator 950 and the transmission panel 930 are bonded to each other. Therefore, the vibration of vibration actuator 950 is restricted, and the sound pressure is low in a range from 3000 Hz to 5000 Hz and a range of 8000 Hz or more, for example.

Configuration Example

Figure 5:
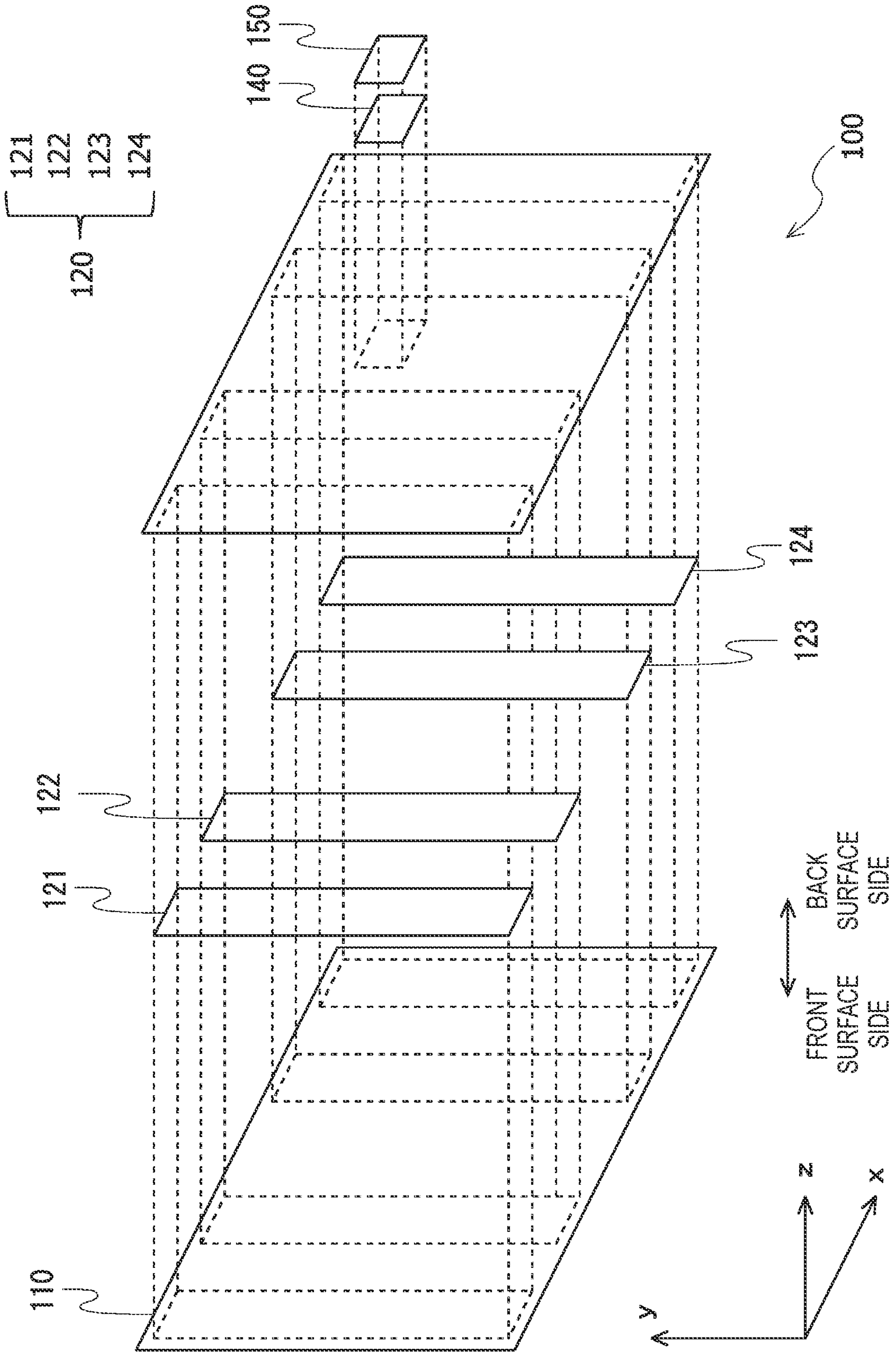
FIG. 5 is an exploded perspective view of a display speaker 100.
Figure 6:
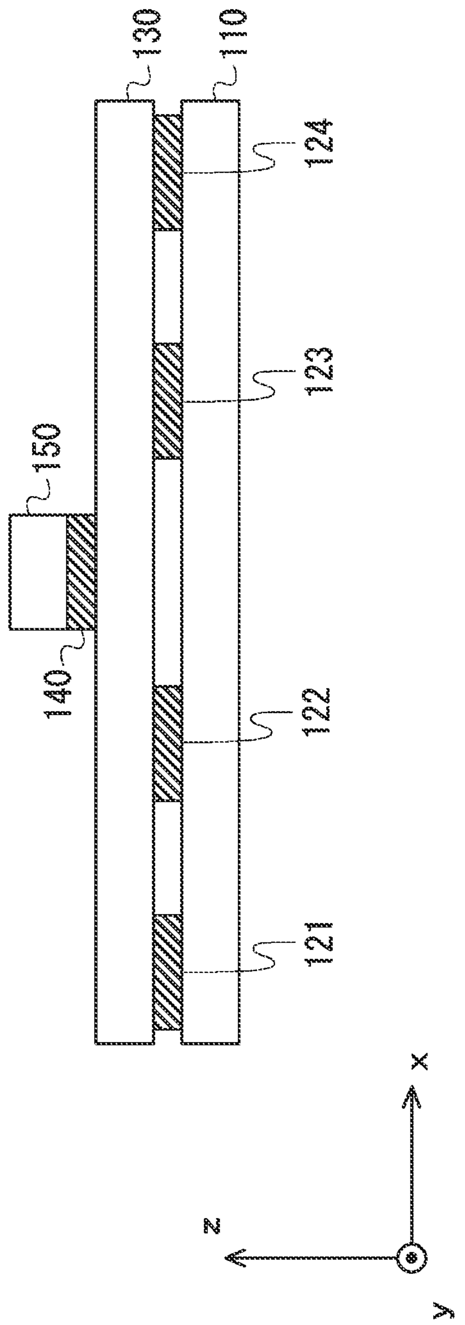
FIG. 6 is a cross-sectional view taken along a plane that passes through a vibration actuator 150 of the display speaker 100 and that is parallel to an xz plane.
Figure 7:
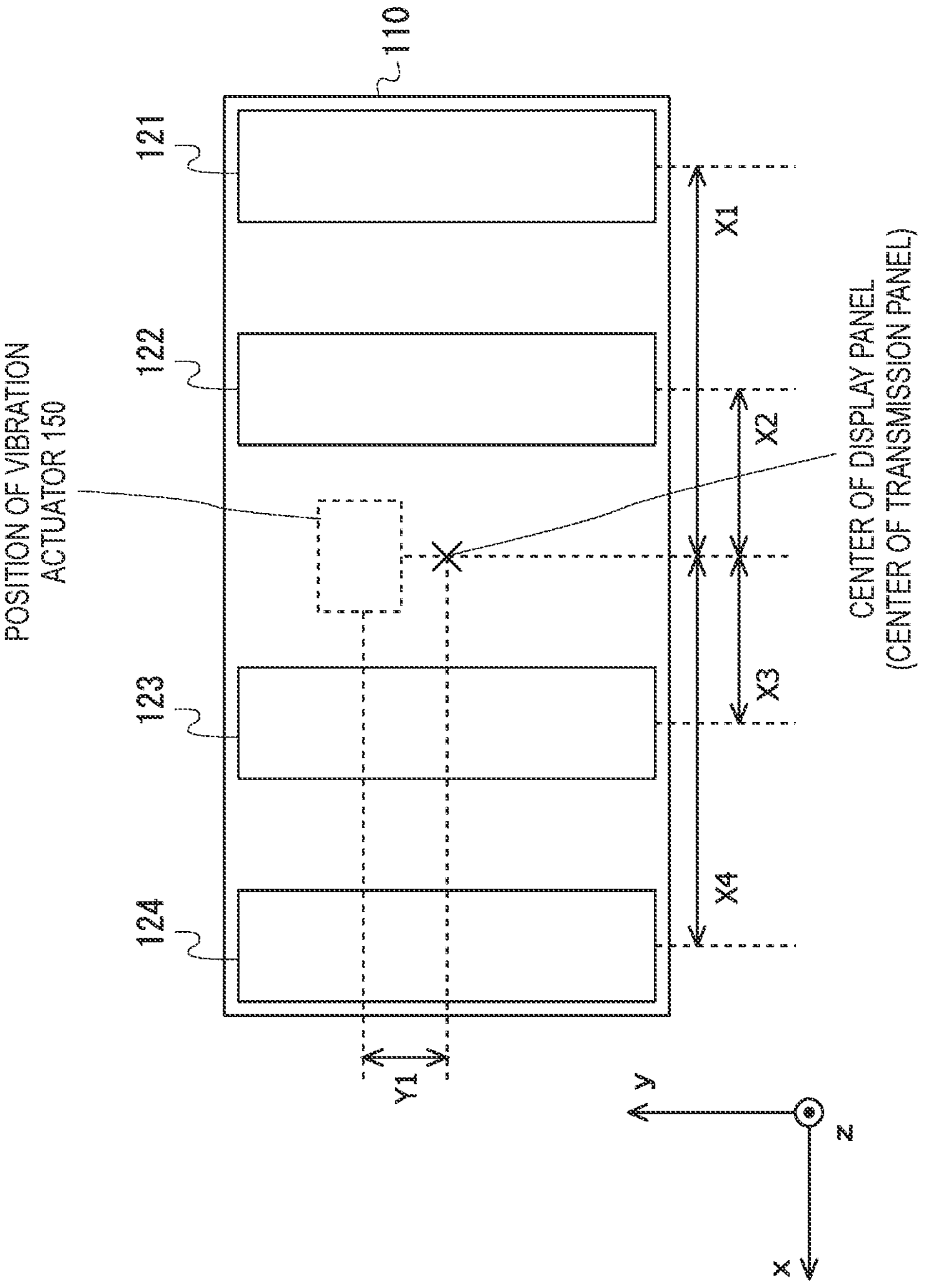
FIG. 7 is a view of a display panel 110 and a first adhesive layer 120 as viewed from a back surface side.

FIGS. 5 to 7 are views showing a configuration example of a display speaker 100 of the present embodiment. FIG. 5 is an exploded perspective view of the display speaker 100. The display speaker 100 includes a display panel 110, a first adhesive layer 120, a transmission panel 130, a second adhesive layer 140, and a vibration actuator 150. Here, in a plan view of the display panel 110 as viewed from a front surface side, a direction from left to right is defined as an x direction, a direction from bottom to top is defined as a y direction, and a direction from a front surface to a back surface is defined as a z direction. The x direction, the y direction, and the z direction are orthogonal to one another. FIG. 6 is a cross-sectional view taken along a plane that passes through the vibration actuator 150 of the display speaker 100 and that is parallel to an xz plane. FIG. 7 is a view of the display panel 110 and the first adhesive layer 120 as viewed from a back surface side. In FIG. 7, a position corresponding to a position of the vibration actuator 150 is shown.

The display panel 110 is a plate-shaped rectangular panel serving as a diaphragm of the display speaker 100. Each side of an outer shape of the display panel 110 is parallel to an x axis or a y axis. That is, two facing sides of the rectangle of the outer shape of the display panel 110 are parallel to a first direction (x direction), and the other two facing sides are parallel to a second direction (y direction) orthogonal to the first direction. The display panel 110 is, for example, a flat glass panel or an organic light emitting diode (OLED) panel. The display panel 110 is adhered to the transmission panel 130 via the first adhesive layer 120. The display panel 110 is an example of a first panel. The shape of the display panel 110 or the like is not limited to the rectangular shape, and may be other shapes such as a quadrilateral shape other than the rectangular shape, a triangular shape, a polygonal shape, an elliptical shape, and a circular shape.

The first adhesive layer 120 is divided into a plurality of regions, and adheres a back surface side of the display panel 110 to a front surface side of the transmission panel 130. In the example of FIG. 5, the first adhesive layer 120 includes a first region 121, a second region 122, a third region 123, and a fourth region 124. Each region of the first adhesive layer 120 is, for example, a double-sided adhesive tape. Each region of the first adhesive layer 120 may be an adhesive. The regions are arranged at different positions so as not to overlap one another in a plan view (when viewed from a front surface side or a back surface side, when viewed from a direction orthogonal to the x direction and the y direction). Each of the first region 121, the second region 122, the third region 123, and the fourth region 124 is a strip-shaped rectangle parallel to the y axis. The first region 121, the second region 122, the third region 123, and the fourth region 124 are parallel to one another. The first region 121 and the fourth region 124 have the same shape. The second region 122 and the third region 123 have the same shape. The first region 121 and the second region 122 may have the same shape. Each of the first region 121, the second region 122, the third region 123, and the fourth region 124 has a width in the y direction larger than a width in the x direction. Here, the y direction is a longitudinal direction of each of the first region 121, the second region 122, the third region 123, and the fourth region 124. In the x direction, a distance (X1) between the first region 121 and a center of the display panel 110 is equal to a distance (X4) between the fourth region 124 and the center of the display panel 110. In a plan view, the first region 121 and the fourth region 124 are located at point-symmetric positions with respect to the center of the display panel 110. In the x direction, a distance (X2) between the second region 122 and the center of the display panel 110 is equal to a distance (X3) between the third region 123 and the center of the display panel 110. In a plan view, the second region 122 and the third region 123 are located at point-symmetric positions with respect to the center of the display panel 110. The same applies to a relationship between a center of the transmission panel 130 and each region. The display panel 110 and the transmission panel 130 are not adhered to each other at a portion other than the regions of the first adhesive layer 120 between the display panel 110 and the transmission panel 130. That is, the portion other than the regions of the first adhesive layer 120 between the display panel 110 and the transmission panel 130 is, for example, a gap. The portion other than the regions of the first adhesive layer 120 between the display panel 110 and the transmission panel 130 is not the first adhesive layer 120. Unlike the comparative example described above, the regions of the first adhesive layer 120 do not exist at a portion overlapping the vibration actuator 150 (the second adhesive layer 140) in a plan view. The number of regions of the first adhesive layer 120 is not limited to four. A distance between a certain position and the region is a distance between the certain position and a center of the region. The center of the rectangle of the display panel 110 or the like is obtained as, for example, an intersection position of diagonal lines of the rectangle. The center used here is not limited to a geometric center, and may be within a certain range including the geometric center. The certain range including the geometric center is, for example, a range of a circle having a radius of 2 cm around the geometric center, a range of a circle having a radius of 5% of a maximum width of the display panel 110 around the geometric center, or the like. The center of the display panel 110 or the like may be defined by a center of gravity, an inner center, an outer center, an intersection of center lines of widths in two orthogonal directions, or the like. The first region 121, the second region 122, the third region 123, and the fourth region 124 may not be parallel to the outer shape of the display panel 110.

The transmission panel 130 is disposed on the back surface side of the display panel 110 and between the display panel 110 and the vibration actuator 150. The transmission panel 130 is a rectangular panel having substantially the same size as the display panel 110 when viewed from the front surface side (in a plan view). The transmission panel 130 transmits a vibration of the vibration actuator 150 to the display panel 110. The transmission panel 130 is, for example, a metal plate such as an aluminum plate. In a plan view, a position of a center of the transmission panel 150 and a position of the center of the display panel 110 are the same. The transmission panel 130 is an example of a second panel.

For example, the second adhesive layer 140 is disposed over the entire front surface of the vibration actuator 150, and bonds a back surface side of the transmission panel 130 and a front surface side of the vibration actuator 150. The second adhesive layer 140 is, for example, a double-sided adhesive tape. The second adhesive layer 140 may be an adhesive. The second adhesive layer is an example of a coupling portion. Instead of the second adhesive layer, a boss press-fitted into the transmission panel 130 and a screw for fixing the vibration actuator 150 to the boss may be used as the coupling portion. At this time, the vibration actuator 150 is provided with a screw hole through which the screw passes. The transmission panel 130 and the vibration actuator 150 are coupled to each other by the coupling portion. The coupling portion that couples the transmission panel 130 and the vibration actuator 150 is not limited to the one described herein, and may be a coupling portion that couples the transmission panel 130 and the vibration actuator 150 by another configuration.

The vibration actuator 150 is disposed on the back surface side of the transmission panel 130. The vibration actuator 150 is a plate-shaped rectangular member smaller than the transmission panel 130. The vibration actuator 150 is disposed, for example, at a position shifted in parallel in the y direction from the center of transmission panel 130 in a plan view. Here, a distance between the center of the transmission panel 130 and the vibration actuator 150 in they direction is defined as Y1. That is, the vibration actuator 150 is disposed on a straight line that passes through the center of the transmission panel 130 and that is parallel to the y direction. The vibration actuator 150 may be disposed at a center position of the transmission panel 130 in a plan view. The vibration actuator 150 is, for example, a piezoelectric element. The vibration actuator 150 vibrates by expanding and contracting according to an applied drive voltage. A plurality of vibration actuators 150 may be disposed on the back surface side of the transmission panel 130. The vibration actuator 150 may have a shape other than the rectangular shape. The vibration actuator 150 is an example of a vibration part.

The regions of the first adhesive layer 120 do not exist on a front surface side of a region (the second adhesive layer 140) in which the transmission panel 130 and the vibration actuator 150 are bonded.

Figure 8:
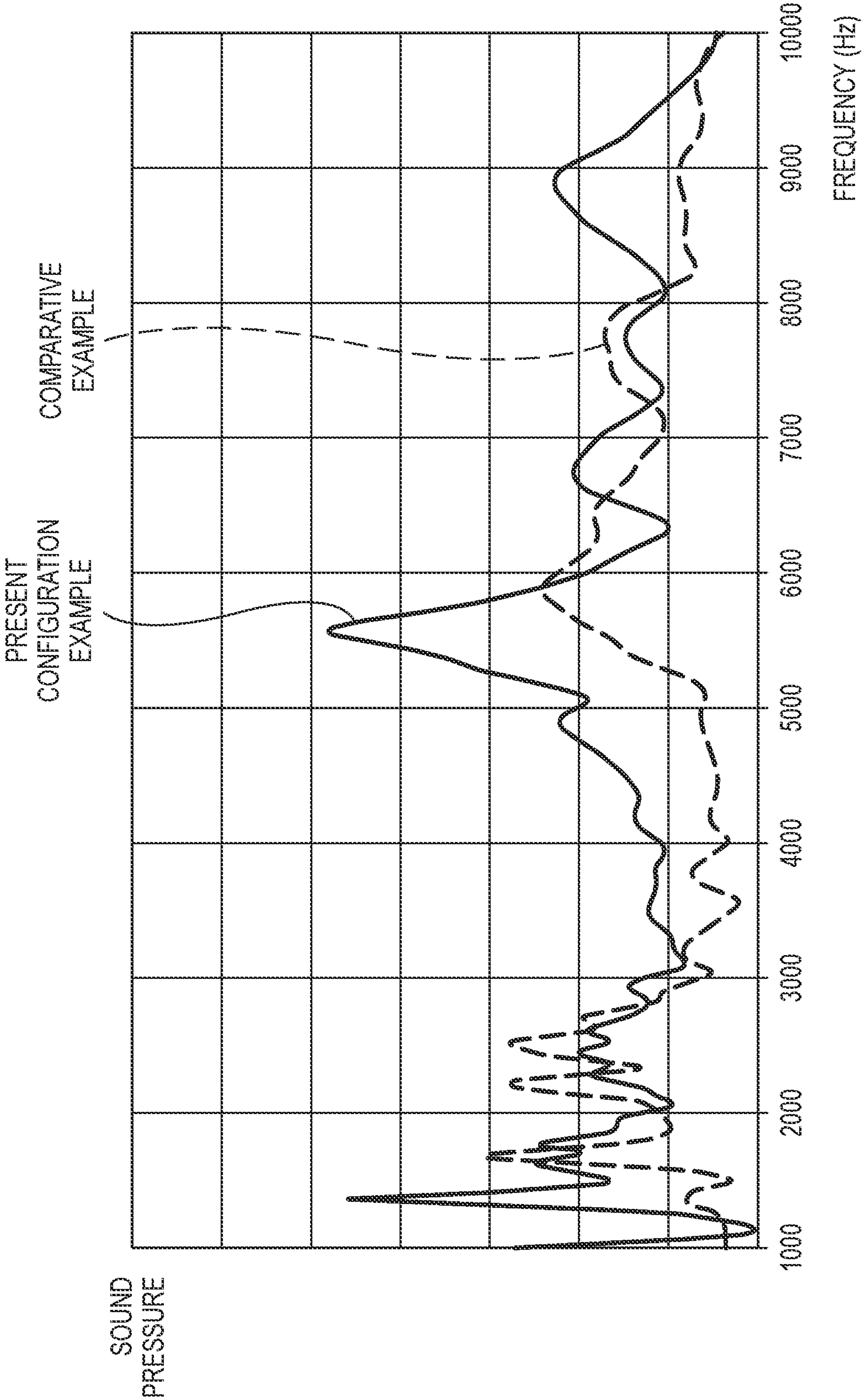
FIG. 8 is a diagram showing an example of frequency dependence of a sound pressure of a sound output from the display speaker 100.

FIG. 8 is a diagram showing frequency dependence of a sound pressure of a sound output from the display speaker 100. In the graph of FIG. 8, a horizontal axis represents a frequency, and a vertical axis represents a sound pressure. The sound pressure on the vertical axis is not an absolute sound pressure value but a relative value with respect to a reference value. FIG. 8 also shows the example of the display speaker 900 of the comparative example shown in FIG. 4 for comparison. Unlike the comparative example, the transmission panel 130 and the display panel 110 are not adhered to each other at a position where the vibration actuator 150 and the transmission panel 130 are bonded to each other in a plan view. Therefore, the sound pressure (this configuration example) of the sound output from the display speaker 100 is higher than that of the comparative example, for example, in a range from 3000 Hz to 6000 Hz and a range of 8000 Hz or more. Further, the sound pressure of the sound output from the display speaker 100 is equal to that of the comparative example in a range of 3000 Hz or less and a range from 6000 Hz to 8000 Hz. Therefore, as a whole, the sound pressure of the sound output from the display speaker 100 is higher than that of the comparative example. Since the transmission panel 130 and the display panel 110 are not adhered to each other at the position where the vibration actuator 150 and the transmission panel 130 are bonded to each other in a plan view, resistance to the vibration is reduced, and the display panel 110 is easily vibrated.

[First Modification]

Next, a first modification will be described. The first modification has points in common with the above-described configuration example. Therefore, the difference will be mainly described, and the description of the common points will be omitted. Components having the same configurations as those in the above-described configuration example are denoted by the same reference numerals.

Figure 9:
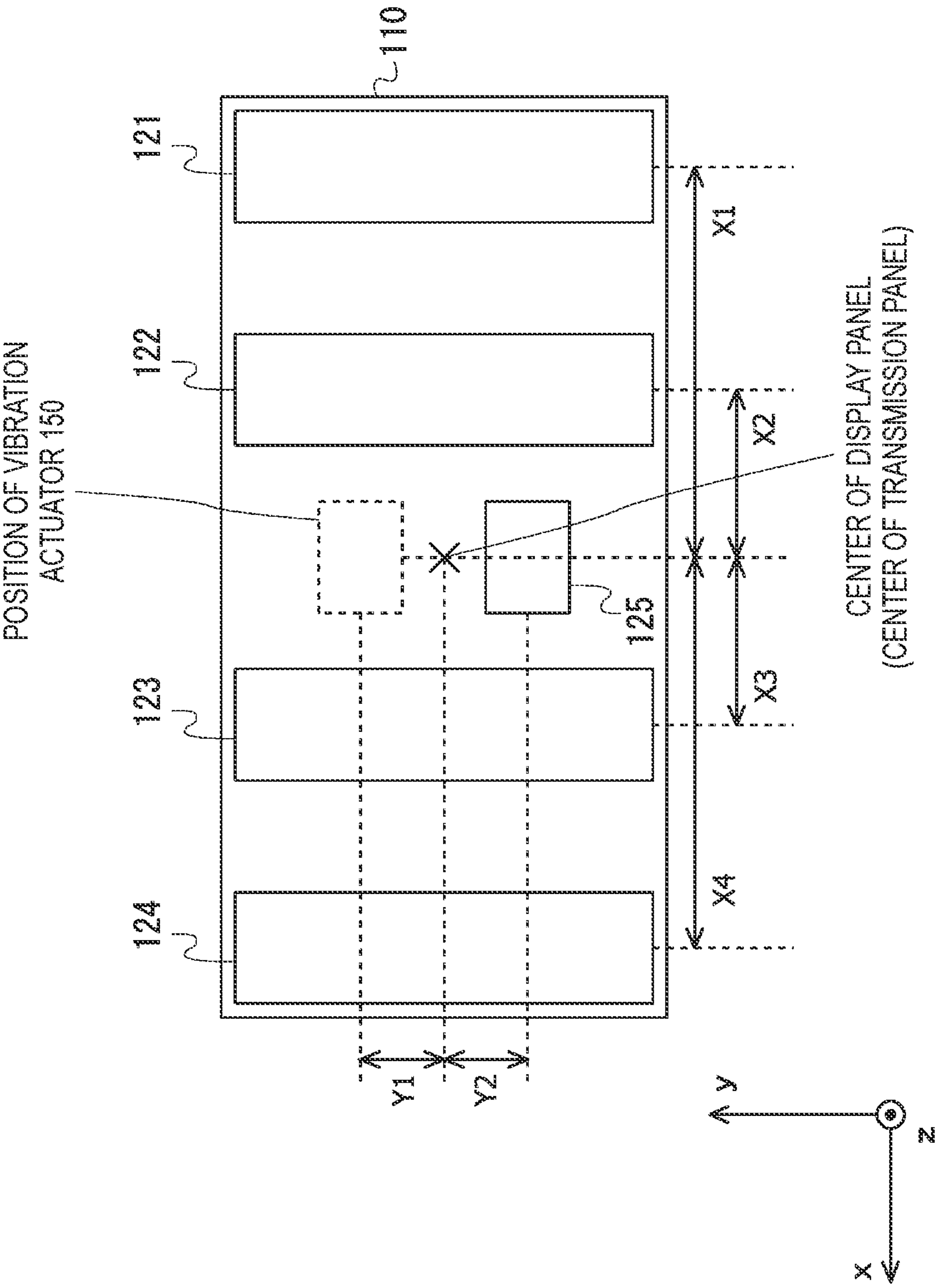
FIG. 9 is a view of the display panel 110 and the first adhesive layer 120 of the display speaker 100 according to a first modification as viewed from a back surface side.

FIG. 9 is a view of the display panel 110 and the first adhesive layer 120 of the display speaker 100 according to the first modification as viewed from a back surface side. In FIG. 9, a position corresponding to a position of the vibration actuator 150 is shown. The display speaker 100 according to the first modification includes the first adhesive layer 120 including the first region 121, the second region 122, the third region 123, and the fourth region 124, similarly to the above-described configuration example. Further, the first adhesive layer 120 includes a fifth region 125. The vibration actuator 150 bonded to the transmission panel 130 via the second adhesive layer 140 is disposed at a position shifted in parallel by a distance Y1 in the y direction (+y direction) from a center of the transmission panel 130 in a plan view. The fifth region 125 is disposed at a position (an example of an offset position) shifted in parallel by a distance Y2 in the y direction (—y direction) from a center of the display panel 110 (the transmission panel 130) in a plan view. Here, the distance Y1 and the distance Y2 are equal to each other. That is, the vibration actuator 150 (second adhesive layer 140) and the fifth region 125 are disposed on a straight line that passes through the center of transmission panel 130 and that is parallel to the y direction. The second adhesive layer 140 and the fifth region 125 of the first adhesive layer 120 have the same shape. Therefore, in a plan view, the fifth region 125 of the first adhesive layer 120 and the second adhesive layer 140 are located at point-symmetric positions with respect to the center of the transmission panel 130.

Figure 10:
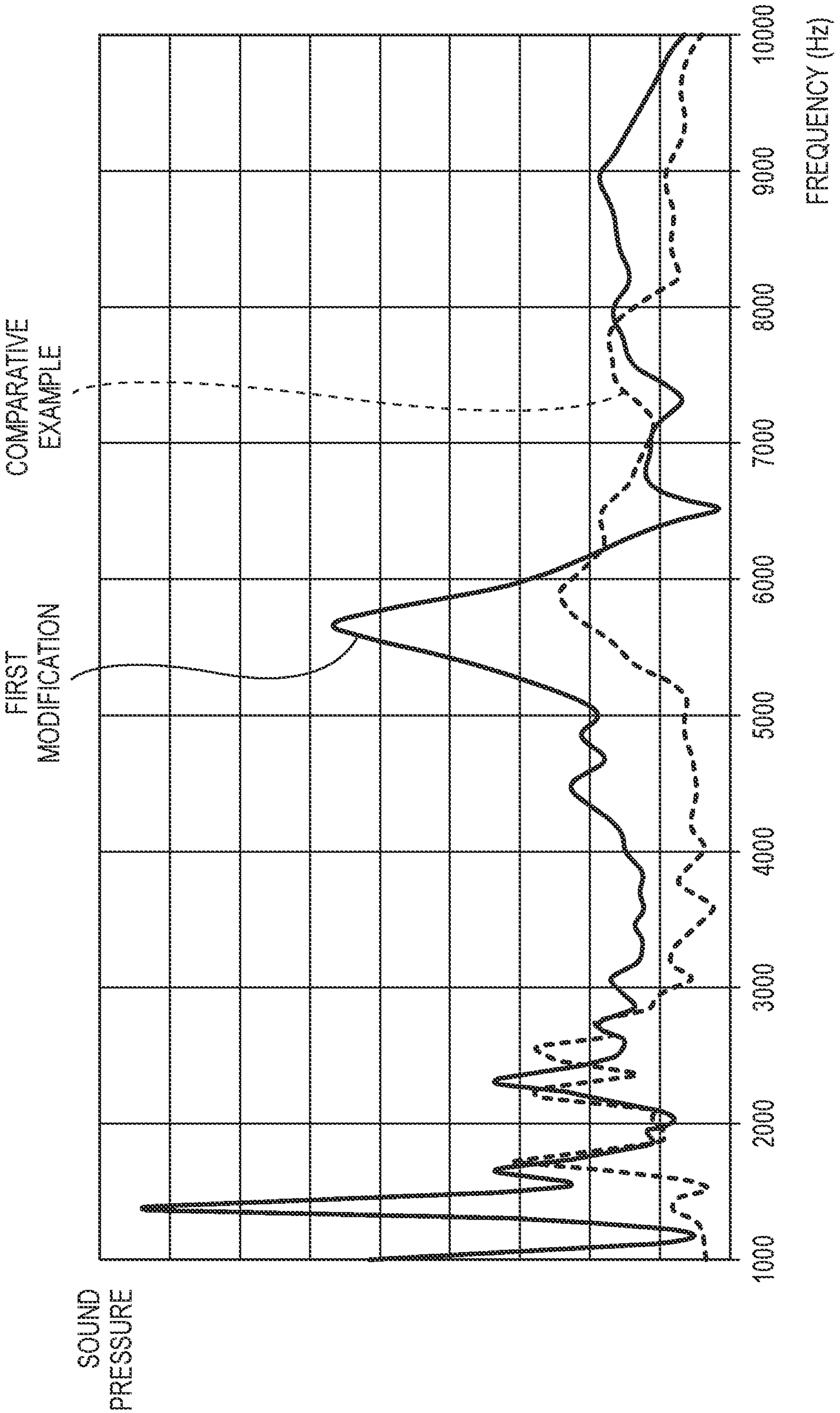
FIG. 10 is a diagram showing frequency dependence of a sound pressure of a sound output from the display speaker 100 according to the first modification.

FIG. 10 is a diagram showing frequency dependence of a sound pressure of a sound output from the display speaker 100 according to the first modification. In the graph of FIG. 10, a horizontal axis represents a frequency, and a vertical axis represents a sound pressure. The sound pressure on the vertical axis is not an absolute sound pressure value but a relative value with respect to a reference value. FIG. 10 also shows the example of the display speaker 900 of the comparative example shown in FIG. 4 for comparison. A sound pressure of a sound output from the display speaker 100 according to the first modification is higher than that of the comparative example, for example, in a range from 3000 Hz to 6000 Hz and in a range of 8000 Hz or more. Further, the sound pressure of the sound output from the display speaker 100 according to the first modification is equal to that of the comparative example in a range of 3000 Hz or less and a range from 6000 Hz to 8000 Hz. Therefore, as a whole, the sound pressure of the sound output from the display speaker 100 of the first modification is higher than that of the comparative example. Since the transmission panel 130 and the display panel 110 are not adhered to each other at the position where the vibration actuator 150 and the transmission panel 130 are bonded to each other in a plan view, resistance to the vibration is reduced, and the display panel 110 is easily vibrated. In addition, since the fifth region 125 of the first adhesive layer 120 and the second adhesive layer 140 are located at point-symmetric positions with respect to the center of the transmission panel 130 in a plan view, the display panel 110 is easily vibrated. Further, since the fifth region 125 of the first adhesive layer 120 and the second adhesive layer 140 are located at point-symmetric positions with respect to the center of the transmission panel 130 in a plan view, an antinode portion of flexural vibration can be excited, and the display panel 110 can be efficiently vibrated.

[Second Modification]

Next, a second modification will be described. The second modification has points in common with the above-described configuration example and the first modification. Therefore, the difference will be mainly described, and the description of the common points will be omitted. Components having the same configurations as those in the above-described configuration example are denoted by the same reference numerals.

Figure 11:
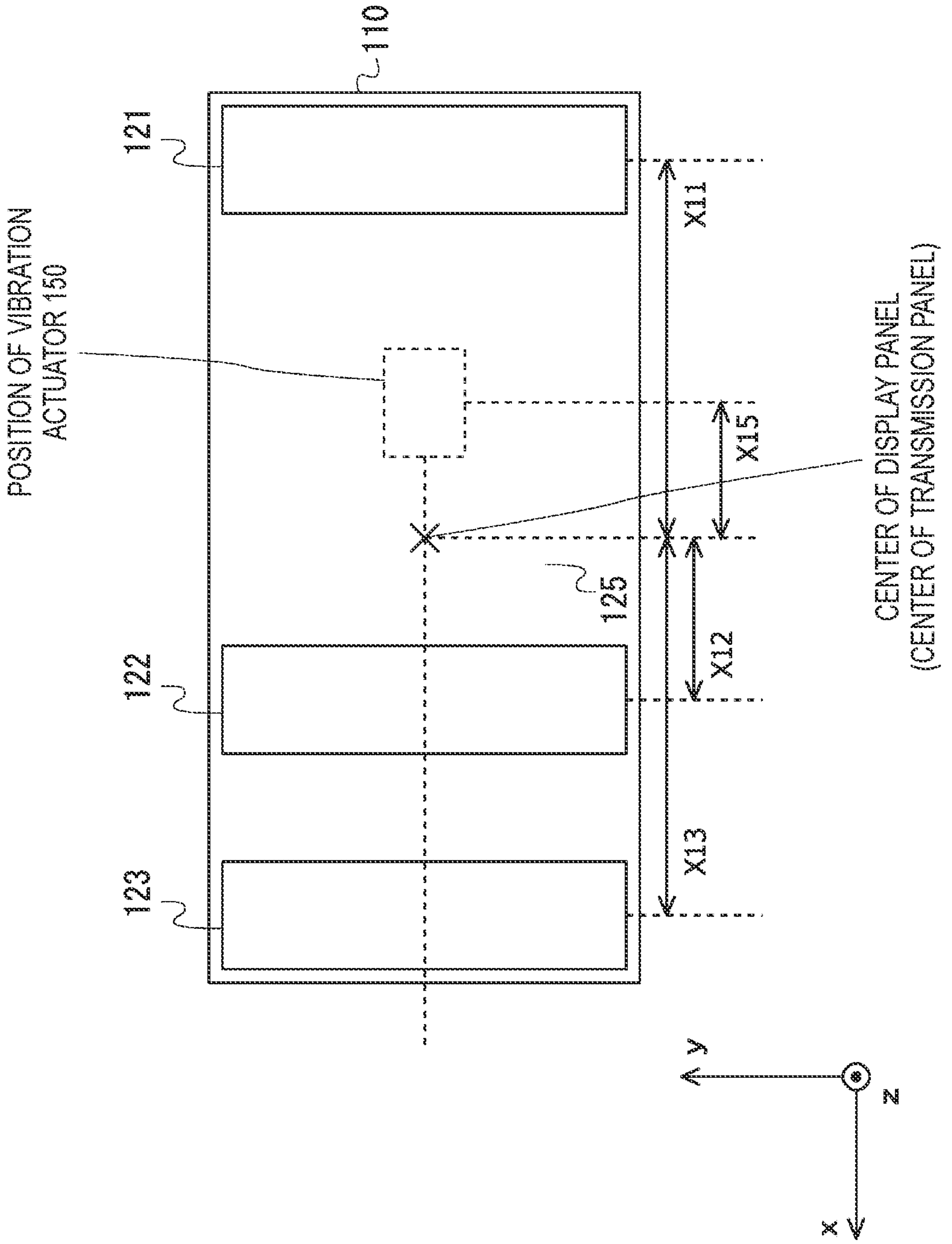
FIG. 11 is a view of the display panel 110 and the first adhesive layer 120 of the display speaker 100 according to a second modification as viewed from a back surface side.

FIG. 11 is a view of the display panel 110 and the first adhesive layer 120 of the display speaker 100 according to the second modification as viewed from a back surface side. In FIG. 11, a position corresponding to a position of the vibration actuator 150 is shown. The display speaker 100 according to the second modification includes the first adhesive layer 120 including the first region 121, the second region 122, and the third region 123. Each of the first region 121, the second region 122, and the third region 123 is a strip-shaped rectangle parallel to the y axis. The vibration actuator 150 bonded to the transmission panel 130 via the second adhesive layer 140 is disposed at a position (an example of an offset position) shifted in parallel by a distance X15 in the x direction (—x direction) from a center of the transmission panel 130 in a plan view. That is, the vibration actuator 150 is disposed on a straight line that passes through the center of the transmission panel 130 and that is parallel to the x direction. In the x direction, a distance between the first region 121 and a center of the display panel 110 is a distance X11. In the x direction, a distance between the second region 122 and the center of the display panel 110 is a distance X12. In the x direction, a distance between the third region 123 and the center of the display panel 110 is a distance X13. Here, it is assumed that the distance X13 is larger than the distance X12. In FIG. 11, the first region 121 is located on a right side (−x direction) of the center of the display panel 110, and the second region 122 and the third region 123 are located on a left side (+x direction) of the center of the display panel 110. Here, it is assumed that an interval (X11+X12) between the first region 121 and the second region 122 is different from an interval (X13-X12) between the second region 122 and the third region 123. Since (X11+X12) and (X13-X12) have different values, the display speaker 100 can resonate sounds of various frequencies. Since the display speaker 100 can resonate sounds of various frequencies, the sound quality of the sound can be improved.

[Others]

The regions of the first adhesive layer 120 and the second adhesive layer 140 may be disposed at positions other than the positions of the respective regions of the first adhesive layer 120 and the position of the second adhesive layer 140 (vibration actuator 150) as in the configuration example, the first modification, and the second modification. However, in a plan view, all of the regions of the first adhesive layer 120 and the second adhesive layer 140 are disposed at different positions so as not to overlap one another. A part of the regions of the first adhesive layer 120 may be omitted.

[Operation and Effects of Embodiment]

The display speaker 100 of the present embodiment includes the display panel 110, the first adhesive layer 120, the transmission panel 130, the second adhesive layer 140, and the vibration actuator 150. The back surface side of the display panel 110 and the front surface side of the transmission panel 130 are adhered to each other via the first adhesive layer 120. The back surface side of the transmission panel 130 and the front surface side of the vibration actuator 150 are bonded to each other via the second adhesive layer 140. The first adhesive layer 120 includes a plurality of strip-shaped regions. The plurality of strip-shaped regions in the first adhesive layer 120 are parallel to one another. The regions of the first adhesive layer 120 are disposed at different regions that do not overlap the second adhesive layer 140 in a plan view. Since the transmission panel 130 and the display panel 110 are not adhered to each other at the position where the vibration actuator 150 and the transmission panel 130 are bonded to each other in a plan view, resistance to the vibration is reduced, and the display panel 110 is easily vibrated. Since the regions of the first adhesive layer 120 are disposed at different regions that do not overlap the second adhesive layer 140 in a plan view, a sound having a higher sound pressure than that in the comparative example can be output. According to the display speaker 100, a panel speaker with improved sound quality of an output sound can be provided.

Although having been described above, the embodiment of the present invention is merely an example, and the present invention is not limited thereto. Various modifications based on the knowledge of those skilled in the art can be made without departing from the gist of the claims. The embodiments described above can be implemented in combination as much as possible.

REFERENCE SIGNS LIST

100: display speaker
110: display panel
120: first adhesive layer
121: first region
122: second region
123: third region
124: fourth region
125: fifth region
130: transmission panel
140: second adhesive layer
150: vibration actuator
900: display speaker of comparative example
910: display panel
920: first adhesive layer
921: first region
922: second region
923: third region
924: fourth region
925: fifth region
930: transmission panel
940: second adhesive layer
950: vibration actuator

What is claimed is:

1. A panel speaker comprising:
a first panel;
a second panel;
a vibration actuator configured to vibrate the first panel and the second panel;
an adhesive layer configured to adhere one surface of the first panel to one surface of the second panel; and
a coupling portion configured to couple other surface of the second panel with the vibration actuator, wherein
the adhesive layer includes a plurality of strip-shaped regions parallel to one direction in a plan view of the second panel, and
the coupling portion is disposed at a region sandwiched between adjacent two of the plurality of strip-shaped regions in the plan view of the second panel.

2. The panel speaker according to claim 1, wherein the coupling portion is disposed at a region including a center of the second panel among regions sandwiched between the plurality of strip-shaped regions, in the plan view of the second panel.

3. The panel speaker according to claim 2, wherein the plurality of strip-shaped regions include a first region, a second region, a third region, and a fourth region arranged in this order at intervals in a direction orthogonal to the one direction, and an interval between the second region and the third region is wider than an interval between the first region and the second region and an interval between the third region and the fourth region.

4. The panel speaker according to claim 3, wherein the first region, the second region, the third region, and the fourth region are arranged line-symmetrically with respect to a straight line that passes through the center of the second panel and that is parallel to the one direction, in the plan view of the second panel.

5. The panel speaker according to claim 4, wherein
the second panel is a metal plate.

6. The panel speaker according to claim 4, wherein the first panel is an organic light emitting diode panel.

7. The panel speaker according to claim 6, wherein the coupling portion is disposed at a position on a line that passes through the center of the second panel and that is parallel to a longitudinal direction of the plurality of strip-shaped regions, the position being offset from the center of the second panel.

8. The panel speaker according to claim 2, wherein the plurality of strip-shaped regions include a first region, a second region, and a third region arranged in this order at intervals in a direction orthogonal to the one direction, and an interval between the first region and the second region is different from an interval between the second region and the third region.

9. The panel speaker according to claim 2, wherein the coupling portion is disposed on a line that passes through the center of the second panel and that is parallel to a longitudinal direction of the plurality of strip-shaped regions.

10. The panel speaker according to claim 1, wherein
the first panel is a display panel.

11. A panel speaker comprising:
a vibration panel configured by adhering one surface of a first panel to one surface of a second panel; and
a vibration actuator configured to drive and vibrate the vibration panel, wherein
the vibration panel has, in a plan view, stripe shaped adhesive regions in each of which the first panel and the second panel are adhered to each other, and non-adhesive regions defined by the adhesive regions, and
the vibration actuator is coupled to other surface of the second panel so as to drive the non-adhesive regions.

12. The panel speaker according to claim 11, wherein the vibration actuator is coupled to the second panel so as to drive one of the non-adhesive regions including a center of the vibration panel in a plan view of the vibration panel.

13. The panel speaker according to claim 12, wherein, in the plan view of the vibration panel, an interval between adjacent stripes in the adhesive regions differs.

14. The panel speaker according to claim 13, wherein, in the adhesive regions, the interval between the stripes sandwiching the center of the vibration panel is larger than the interval between the stripes not sandwiching the center of the vibration panel in the plan view of the vibration panel.

15. The panel speaker according to claim 12, wherein the adhesive regions are arranged line-symmetrically with respect to a straight line that passes through the center of the vibration panel in the plan view of the vibration panel.

16. The panel speaker according to claim 12, wherein the vibration actuator is coupled to a position deviated from the center of the vibration panel in the plan view.

* * * * *